United States Patent [19]

Tice

[11] Patent Number: 4,913,387
[45] Date of Patent: Apr. 3, 1990

[54] APPARATUS FOR REMOVABLY MOUNTING A COMPUTER INPUT DEVICE

[75] Inventor: William W. Tice, Nashua

[73] Assignee: Hewlett-Packard Company, Palo Alto, Calif.

[21] Appl. No.: 324,945

[22] Filed: Mar. 17, 1989

[51] Int. Cl.⁴ ............................................. A47B 37/00
[52] U.S. Cl. .................................. 248/918; 248/639; 312/208; 108/143; 400/717
[58] Field of Search ............... 248/1 A, 1 B, 639, 298, 248/359 C, 122, 128, 424, 213.2, 309.1, 359 R; 312/208, 196; 340/700; 400/717, 718; 108/102, 143, 137

[56] References Cited

U.S. PATENT DOCUMENTS

| | | | |
|---|---|---|---|
| 1,659,164 | 2/1928 | Sanders | 400/717 |
| 1,867,426 | 7/1932 | Thompson | 400/717 |
| 2,414,110 | 1/1947 | Lee | 248/346 |
| 3,036,687 | 5/1962 | Hoffman | 400/717 |
| 4,494,755 | 1/1985 | Caillouet | 248/1 B |
| 4,561,619 | 12/1985 | Robillard | 108/143 |
| 4,568,212 | 2/1986 | Cooke | 312/208 |
| 4,736,689 | 4/1988 | Stanko | 108/143 |

FOREIGN PATENT DOCUMENTS 3132015 10/1982 Fed. Rep. of Germany ...... 248/1 B

Primary Examiner—Ramon O. Ramirez
Assistant Examiner—Robert A. Olson
Attorney, Agent, or Firm—Richard F. Schuette

[57] ABSTRACT

A computer input device removably mounted to a keyboard is disclosed. A bar, which may be slightly longer than the width of the keyboard, is slidably mounted beneath the keyboard. The bar is slidable from a first position in which one end of the bar extends beyond the side of the keyboard to a second position in which the other end of the bar extends beyond the other side of the keyboard. An input device, such as a trackball, is removably attached, for example, by hook and loop fasteners, to the end of the bar which extends beyond the side of the keyboard. To move the device to the other side of the keyboard, the device is lifted off the end of the bar, the bar is slid under the keyboard until the other end extends beyond the other side of the keyboard, and the device is attached on the other end of the bar. The removable mount of the present invention thus accommodates left and right side mounting, eases the switching from side to side, and takes up minimum space.

12 Claims, 2 Drawing Sheets

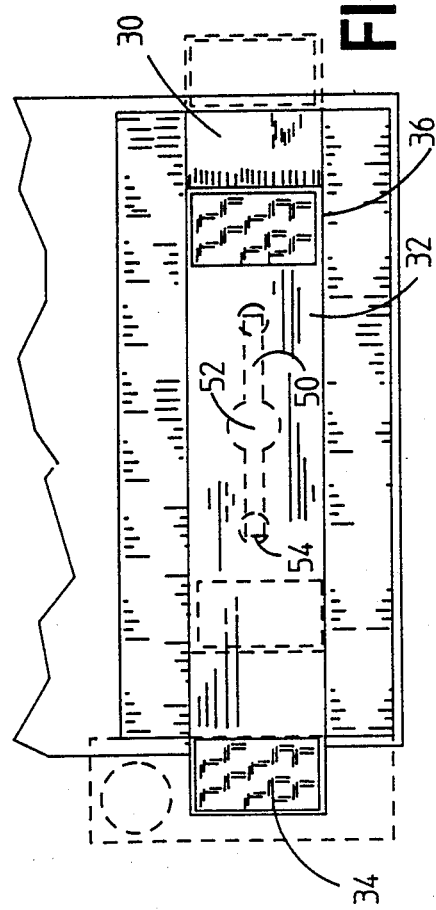
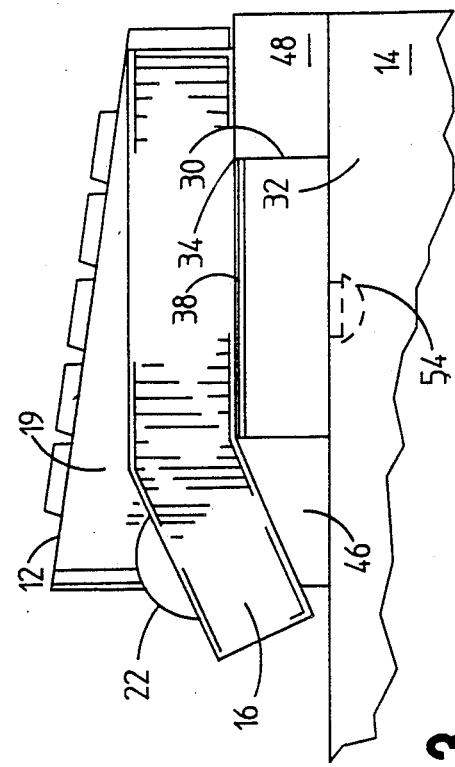
FIG 2
FIG 3

APPARATUS FOR REMOVABLY MOUNTING A COMPUTER INPUT DEVICE

FIELD OF THE INVENTION

This invention relates to the field of computer input devices and, more particularly, to input devices provided in addition to a keyboard.

BACKGROUND OF THE INVENTION

A device for inputting data into a computer is one of the necessary peripheral devices associated with every computer. Commonly, a keyboard is used for this purpose. Alternative or supplemental devices to input data also exist. Well known among these other devices are the trackball, the mouse, and the joystick.

In many applications, the computer and its associated input devices rest on a table or similar surface. Such a surface is necessary to roll the mouse on or support the joystick. However, in other applications, space is limited. For example, if the computer must be moved from place to place, the computer may be placed on a mobile cart. Surface area on such a cart may be limited, even to the extent of precluding the use of a mouse or any other input device besides a keyboard.

One solution is to attach a bracket to one side of the keyboard for mounting an input device (other than a mouse requiring a surface). However, if it is desired to move the input device from one side to the other, for example to accommodate both left-handed and right-handed users, it is necessary to attach a bracket to both sides of the keyboard. However, this solution increases the overall width of the package of input devices, an undesirable result if space is limited.

SUMMARY OF THE INVENTION

The present invention provides a device for inputting data to a computer in addition to a keyboard which does not require additional surface area for support and uses only minimal width. The keyboard is supported on a surface which does not need to be any wider than the width of the keyboard. A bar is slidable in a passage beneath the keyboard from a first position in which one end of the bar extends beyond the side of the keyboard to a second position in which the other end of the bar extends beyond the other side of the keyboard. The input device preferably is a trackball device which includes a ball that fits in the palm of the hand and is rolled by the hand. The trackball is removably mounted, preferably by a hook and loop fastener, to the end of the bar which extends beyond the side of the keyboard.

To move the trackball to the other side of the keyboard, the trackball is lifted off the end of the bar, the bra is slid under the keyboard until the other end extends beyond the other side of the keyboard, and the trackball is placed on the other end of the bar where it is again held in place by hook and loop fasteners. A stop to prevent movement of the bar too far beyond the keyboard ends may also be included. In this manner, the present invention provides a mounting for an additional input device which accommodates left and right side mounting, is easy to switch from one side to the other, and takes up minimal space.

DESCRIPTION OF THE DRAWINGS

The present invention will be more fully understood from the following detailed description taken in conjunction with the accompanying drawings in which:

FIG. 2 is a partial top view of the invention of FIG. 1 with the keyboard removed; and FIG. 3 is a side view of the invention of FIG. 1.

DETAILED DESCRIPTION OF THE PREFERRED EMBODIMENT

Figure 1:
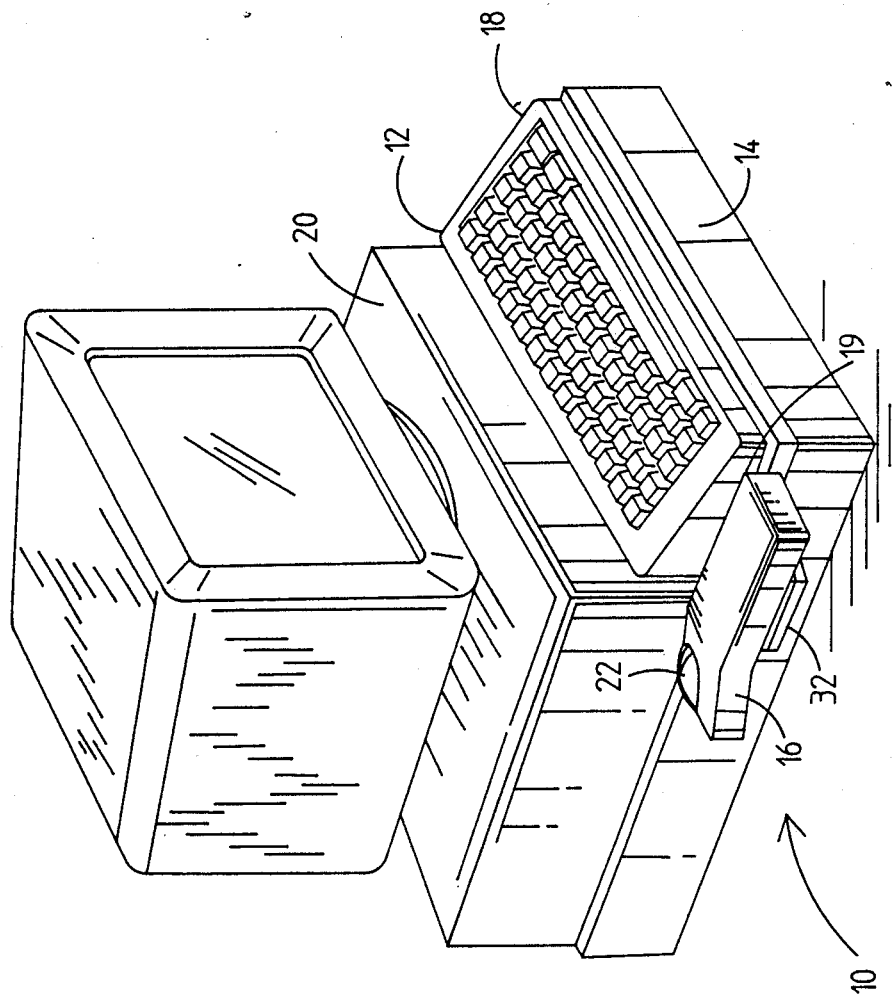
FIG. 1 is a perspective view of the removably mounted input device showing the input device on the left side of the keyboard.

The removably mounted input device is shown generally at 10 in FIG. 1. Keyboard 12 having right side 18 and left side 19 is mounted on supporting base 14. The base 14, which may form part of a moving cart, needs to be no wider than the width of keyboard 12. As shown in FIG. 1, input device 16 is mounted adjacent to the left side 19 of keyboard 12. A computer 20 or other device may also be supported on base 14, extending beyond the rear of keyboard 12.

In the preferred embodiment, input device 16 comprises a trackball 22, although other devices, such as a joystick or a pair of thumbwheels, may be used with the present mounting. Trackball 22 is sized to fit within the palm of a hand. Movement of the palm rolls the trackball 22. Sensors within the input device 16 sense the motion of the trackball 22 and send appropriate signals to the computer 20, for example, to position a cursor on a monitor screen associated with computer 20. Both keyboard 12 and input device 16 may be attached to computer 20 via suitable cables, not shown.

As best shown in FIG. 2, passage 30 is provided beneath keyboard 12 and above base 14. Bar 32 is disposed within passage 30. Bar 32 is slidable beneath keyboard 12 so that one end of bar 32 may project beyond the side of keyboard 12. The length of bar 32 is slightly longer than the keyboard width for ease of grasping when sliding in either direction. A section of hooks or loops 34, 36 is provided on the top surface 33 of bar 32 at each end. Cooperating hooks or loops 38 are provided on the bottom surface 40 of input device 16. In this manner, input device 16 may be attached to whichever end of bar 32 projects beyond keyboard 12.

In FIGS. 1 and 3, input device 16 is shown attached to the left side 19 of keyboard 12. To move input device 16 to the right side 18 of keyboard 12, input device 16 is lifted off the hook and loop fastener 34 of bar 32. Bar 32 may then be slid through passage 30 until the other end of bar 32 projects beyond the right side of keyboard 12. FIG. 2 shows bar 32 in dotted lines projecting beyond right side 18. Input device 16 may then be attached to fastener 36 on the left end of bar 32.

In the preferred embodiment, side members 46 and 48, best shown in FIG. 3, are provided to surround snugly bar 32 so that it does not move laterally. However, any other suitable configuration providing a path or track for bar 32 through or beneath the keyboard may be provided. Additionally, the length of bar 32 may vary, depending on users' desires. For example, its length may be shorter than the keyboard width, so that it may be placed out of sight if desired. The minimum length would typically be one half the keyboard width plus a length necessary to accommodate the appropriate input device.

A stop to prevent further sliding movement of bar 32 also may be provided. In the preferred embodiment, the stop comprises a slot 50 in base 14 with a widened portion 52 through which the head of a screw 54 extending from bar 32 fits. Additionally, when bar 32 is slid to one side, the screw head is retained within the narrow portion of slot 50. This prevents bar 32 from lifting up when pressure is applied to trackball 22 on the end of the bar. Other suitable stop means are contemplated. Further, when bar 32 has been extended fully to one side of the keyboard and input device 16 is affixed to bar 32, input device 16 abuts side 18 or 19 of keyboard 12 and prevents bar 32 from sliding back toward the other side of the keyboard.

The invention is not to be limited by what has been particularly shown and described, except as indicated by the appended claims.

I claim:

1. An apparatus for removably mounting a device for inputting data to a computer having a keyboard, said apparatus comprising:
   a keyboard; an input device; and
   a base for supporting said keyboard;
   movable attaching means, coupled to said base and positioned adjacent to said keyboard, wherein, said attaching means can be moved to extend past either side of said keyboard, wherein said input device is attached on said either side of said keyboard.

2. The apparatus of claim 1, further comprising means for preventing movement of the movable attaching means when the input device is attached to the attaching means.

3. The apparatus of claim 1, wherein the input device comprises a trackball.

4. The apparatus of claim 1, wherein the input device comprises a joystick.

5. The apparatus of claim 1, wherein the input device comprises thumbwheels.

6. The apparatus of claim 1, wherein the movable attaching means comprises a bar slidably mounted beneath said keyboard between a first position, wherein a first end of the bar extends beyond a first side of the keyboard, and a second position, wherein a second end of the bar extends beyond a second side of the keyboard.

7. The apparatus of claim 6, including removably attaching means which comprises hook and loop fasteners on the first end and the second end of the bar and on a bottom surface of the input device.

8. The apparatus of claim 6, said base further comprising a passage between the keyboard and the base configured to fit the bar through which the bar slides.

9. The apparatus of claim 8, further comprising means for preventing the bar from raising off the base when the bar is extended beyond one of the side of the keyboard.

10. The apparatus of claim 6, further comprising means for preventing the slidable movement of the bar beyond the first position and the second position.

11. The apparatus of claim 10, wherein the slidable movement preventing means further includes means for preventing sliding movement of the bar when the input device is attached to the bar.

12. The apparatus of claim 11, wherein the slidable movement preventing means is configured so that the input device abuts one of the sides of the keyboard when the input device is attached to the bar thereby preventing sliding movement of the bar between the first position and the second position.

* * * * *